Patented July 29, 1930

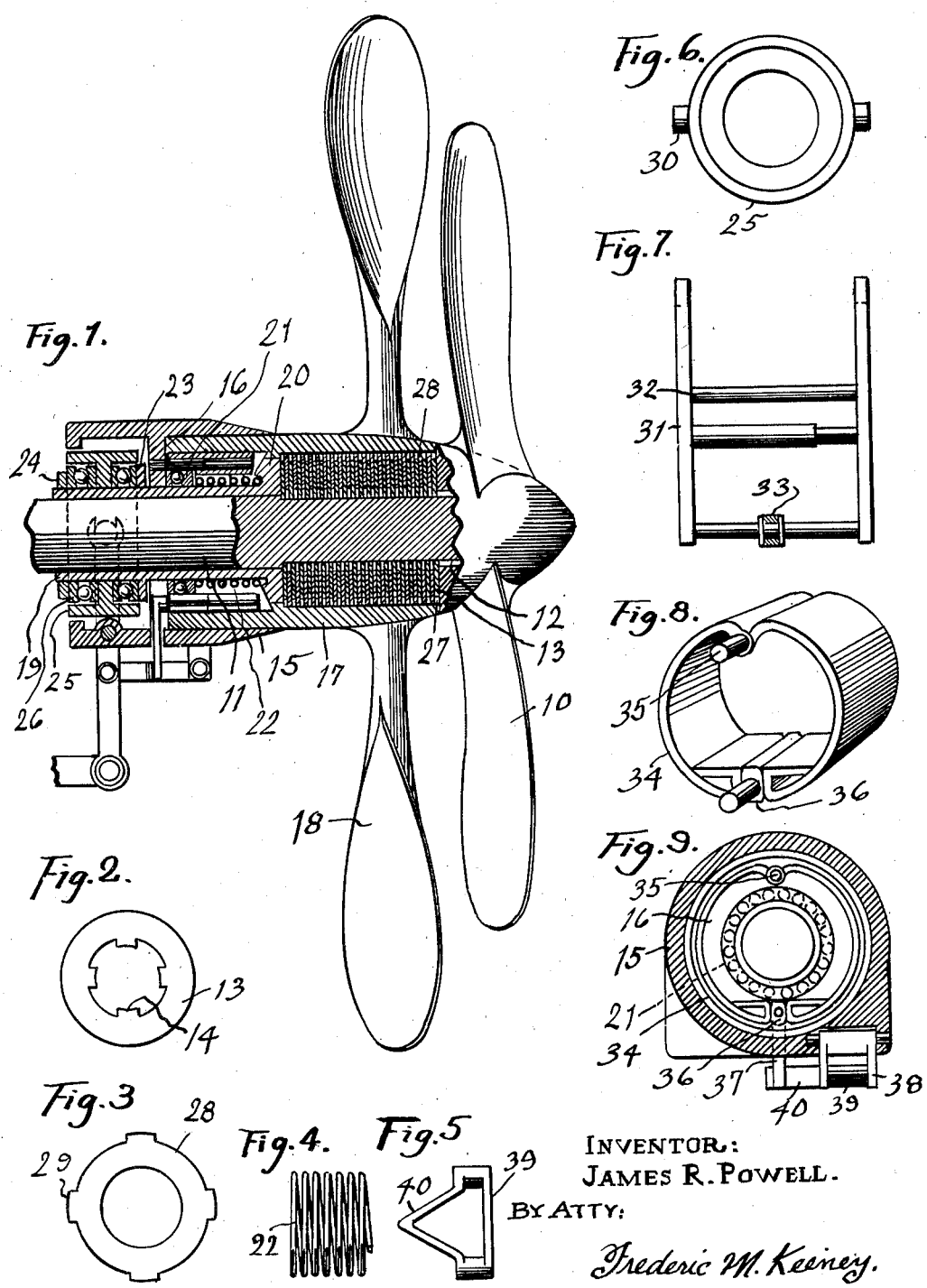

1,771,654

UNITED STATES PATENT OFFICE

JAMES R. POWELL, OF LOS ANGELES, CALIFORNIA

AIRCRAFT PROPELLER

Application filed June 14, 1929. Serial No. 370,830.

This invention relates to an improved form of propeller and combination of propellers, whereby increased tractive power may be attained for driving air craft during special conditions of the air.

The object of this invention is to provide propellers and mechanism therefor which will be effective for aerial propulsion in a rarified atmosphere whereby a full control of the air craft may be maintained in areas of low air pressure, and whereby the regular propeller of an air craft may, at any time and for any period of time, be supplemented by a second propeller of greater diameter and area for the purpose specified.

In carrying out my invention, I provide, in conjunction with an ordinary propeller, an auxiliary propeller of larger diameter, and of greater impelling surface, and preferably having an increased pitch of the impelling blades, disposed adjacent to and apart from, and at the rear of the initial propeller, and clutch elements whereby the auxiliary propeller may be thrown into and out of engagement with the driving shaft of the initial propeller to supplement its impelling effect.

The drawings illustrate an embodiment of the invention which I have so far found to be the most practical in use, but it is to be understood that minor changes, alterations and modifications may be made therein, which may fall within the spirit of the invention and the scope of the appended claims.

In aerial navigation, it will frequently occur that the air craft will suddenly encounter sections of the air, where a rarified condition exists, causing the air craft to fall into a "tail-spin" or otherwise become unmanageable, and to fall to the ground. My invention provides means whereby the air craft impelling means may be quickly changed to an operative position effective for propulsion in the rarified portion of the air.

With these and other objects in view, the invention consists of the novel features of construction and arrangement of parts as will be more fully described and claimed.

In the drawings: Figure 1 is a sectional view of a propeller constructed in accordance with the invention. Fig. 2 is a detail view of a clutch driving plate as used in my invention. Fig. 3 is a detail view of a clutch driven plate. Fig. 4 is a detail view of the clutch actuating spring. Fig. 5 is a detail plan view of the link which actuates the brake mechanism when the clutch mechanism is released. Fig. 6 is a detail view of the clutch release member. Fig. 7 is a detail view of the clutch release member actuating lever. Fig. 8 is a perspective detail view of the brake elements. Fig. 9 is a sectional view of the hub and casing showing the brake elements mounted therein.

Referring more particularly to the drawings, my improvements consist of an initial propeller 10, of the ordinary design and construction, mounted on shaft 11, which has a plurality of key-ways 12. A plurality of driving disks 13, have inner projections 14, engaging with the key-ways 12, on the driving shaft. A fixed housing 15, has an inwardly projecting flange 16, and forms a bearing member for hub 17, having auxiliary propeller blades 18, which are larger and longer than the blades of initial propeller 10, and which may have an increased helical pitch. A slidable sleeve 19, operatively mounted on shaft 11, has an integral clutch pressure plate 20, adapted to bear against the outermost of the driving plates 13, there being a ball thrust bearing 21 adjacent to the casing flange 16, and a clutch actuating spring 22, interposed between thrust bearing 21, and pressure plate 20. Sleeve 19 has a fixed collar 23, and an adjusting nut 24, there being a clutch release member 25 interposed between collar 23 and nut 24, and provided with suitable thrust bearings 26. Auxiliary propeller hub 17, has a plurality of key-ways 27, and clutch driven disks 28, have corresponding projections 29, engaging with key-ways 27. Each driven disk 28 is interposed between corresponding driving plates 13.

As the auxiliary propeller is to be actuated temporarily and for special purposes, the multiple disk clutch is normally in non-operative position. To maintain the clutch in release position, I provide clutch release member 25, with fulcrum pins 30, and a shifting lever 31, fulcrumed on bearing 32, and engaging with pins 30 to shift member 25, thereby releasing the pressure plate 20, and allowing the driving disks to turn freely between the driven disks. Lever 31, through link 33, may be connected to any suitable control lever (not shown) such as are provided with a notched quadrant and other means for adjustment. In the drawings, the member 25, its actuating lever 31, and pressure plate 20, are shown in position wherein the multiple disk clutch is operatively engaged, the actuating spring 22 driving pressure plate 20 against the disks.

To obviate a tendency of the auxiliary propeller to rotate when the multiple disk clutch is in release position, I provide an internal expanding brake 34, mounted on a fixed shaft 35, projecting from fixed casing flange 16. Brake 34 is adapted to be actuated by a cam 36, having a lever arm 37. Apart from shifting lever 31, I provide an auxiliary lever 38, and a link 39, connected to lever 31 and lever 38, the link 39 being formed with a cam 40, adapted to actuate lever arm 37, when the multiple disk clutch is actuated to release position.

From the foregoing description and drawings, it may be seen that I have provided an efficient air-craft propeller, wherein the initial propeller may be supplemented by an auxiliary propeller, and clutch mechanism whereby the auxiliary propeller may be placed in operative and inoperative position, whereby the auxiliary propeller is utilized in landing and launching of air-craft, is maintained in inoperative position during ordinary flight of the air-craft, and which may be operatively engaged to overcome the effects of rarified pockets of air, or other unusual conditions of the atmosphere during aerial flight.

I claim as my invention:

1. Initial and auxiliary propellers, a driving shaft to which the initial propeller is fixed and on which the auxiliary propeller is independently rotatable, and a multiple disk clutch mechanism arranged whereby the propellers are given synchronous rotary movement.

2. Initial and auxiliary propellers, a driving shaft to which the initial propeller is fixed, the auxiliary propeller being independently rotatable thereon, a multiple disk clutch mechanism arranged whereby the propellers may be given synchronous rotary movement, and means for actuating the multiple disk clutch mechanism to inoperative position.

3. Initial and auxiliary propellers, a driving shaft to which the initial propeller is fixed, the auxiliary propeller being independently rotatable relative to the driving shaft, a multiple disk clutch mechanism including an actuating spring, arranged whereby the propellers may be given synchronous rotary movement, and a lever mechanism adapted for compressing the actuating spring, and normally holding the multiple clutch mechanism in release position.

4. The combination with an initial and auxiliary propeller, both mounted on a drive shaft, the auxiliary propeller being independently revoluble relative to the drive shaft, of multiple disk clutch mechanism arranged whereby the driving shaft may actuate the auxiliary propeller in synchronism with the initial propeller, releasing means for the disk clutch mechanism, and brake mechanism for the auxiliary propeller automatically becoming operative when the disk clutch is placed in release position.

JAMES R. POWELL.